Nov. 10, 1925.

B. ENCISO 1,561,315

BAKING MACHINE

Filed Jan. 10, 1925

INVENTOR:
Blas Enciso,
BY
Robt. D. Pearson
ATTORNEY.

Patented Nov. 10, 1925.

1,561,315

UNITED STATES PATENT OFFICE.

BLAS ENCISO, OF LOS ANGELES, CALIFORNIA, ASSIGNOR OF ONE-HALF TO MIGUEL M. AGUILAR, OF LOS ANGELES, CALIFORNIA.

BAKING MACHINE.

Application filed January 10, 1925. Serial No. 1,694.

*To all whom it may concern:*

Be it known that I, BLAS ENCISO, a citizen of the Republic of Mexico, residing at Los Angeles, in the county of Los Angeles and State of California, have invented certain new and useful Improvements in Baking Machines, of which the following is a specification.

My invention is a machine for rolling, cutting and baking cakes and the like.

The object in general of my invention is to provide a machine by means of which cakes may be rolled, cut and baked on both sides, rapidly and in large quantities.

The invention consists in the features of construction, combination of elements and arrangement of parts hereinafter described and pointed out in the claims.

My invention is illustrated in the annexed drawing forming a part of this specification in which.

Corresponding reference numerals designate corresponding parts in all the views.

Figure 1:
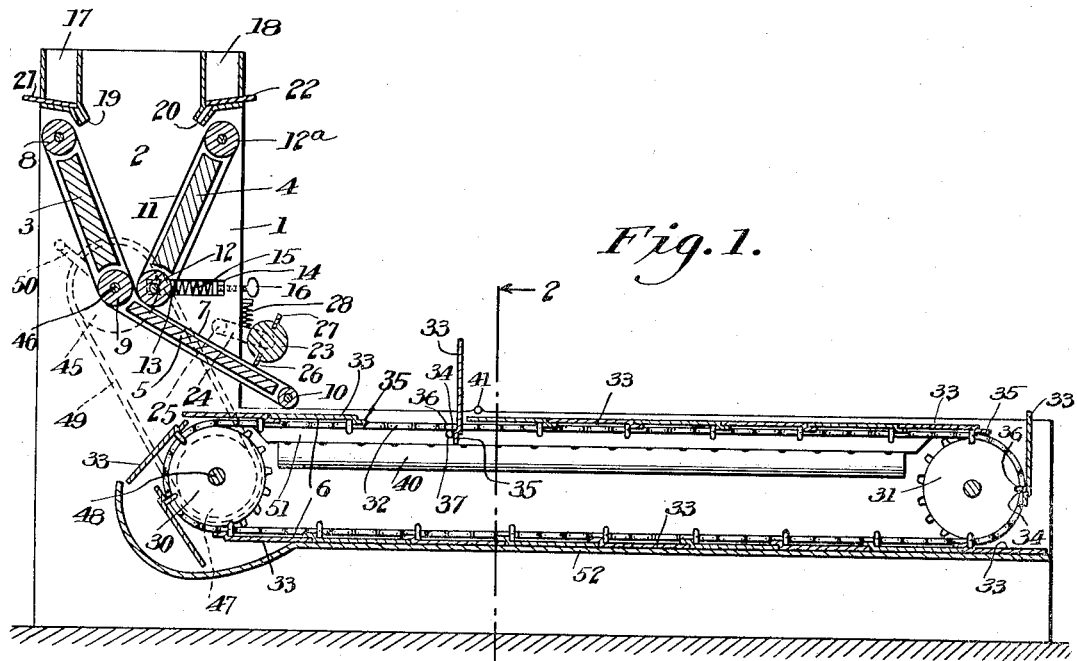
Fig. 1 is a vertical longitudinal section of my invention taken on line 1—1 of Fig. 2.
Figure 2:
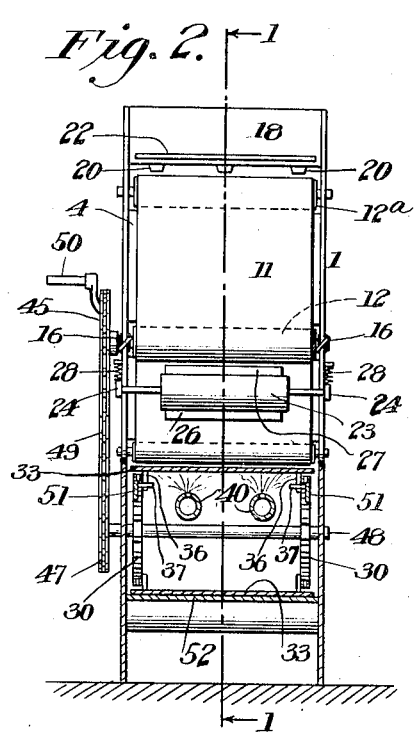
Fig. 2 is a transverse vertical section of my invention taken on line 2—2 of Fig. 1.
Figure 3:
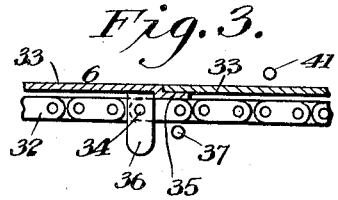
Fig. 3 is a fragmentary detail section of the baking conveyor.

In the drawing 1 indicates a supporting frame in which the various working parts of the machine are mounted. In the upper part at one end of said frame is mounted a dough hopper 2 constructed with a pair of downwardly converging walls 3 and 4. An inclined delivery table 5 leads from the lower end of the dough hopper 2 over one end of a baking conveyor 6.

An apron 7 extends over the inner and outer faces of the hopper wall 3 and table 5 and over rollers 8, 9 and 10; the roller 8 being journaled at the upper edge of said hopper wall, the roller 9 being journaled between the lower edge of said hopper wall and the upper edge of said table, and the roller 10 being journaled along the lower edge of said table.

An apron 11 extends over the inner and outer sides of the hopper wall 4 and over the rollers 12 and 12ª at the lower and upper edges respectively of said wall, the roller edges respectively of said wall, the roller 12 being located opposite the roller 9 and engaging the apron 7 to hold said apron adjacent the upper surface of the table 5.

The roller 12 is journaled at its ends in bearing blocks 13 which are slidably mounted in horizontal slots 14 in the side members of the frame 1. Springs 15 are located in the slots 14 which springs bear at one end against the blocks 13 and set screws 16, seated in the frame 1, engage the other end of the springs 15, by means of which springs and set screws the roller 12 is yieldably and adjustably mounted horizontally with relation to the roller 9 for determining the thickness of the cake as desired which passes out of the hopper 2 between the rollers 9 and 12.

In the top of the hopper 2 are located two receptacles 17 and 18 having outlets 19 and 20 leading into the hopper and controlled by valves 21 and 22 respectively, in which receptacles may be placed water, flour or corn meal to be delivered into the hopper upon opening the valve 21 or 22.

A cutter roller 23 is journaled above the table 5 in a rocking frame 24 pivoted at 25 to the frame 1, on which roller are two blades 26 and 27 located diagonally opposite each other and extending longitudinally of the roller. Compression springs 28 are mounted on the frame 1 and bear against the rocking frame 24, whereby the cutter roller 23 is maintained under pressure in contact with the cake dough on the table 5 and the blades 26 and 27, under pressure, are caused to cut the dough into lengths suitable for cakes as the dough passes off the table onto the baking conveyor 6.

The baking conveyor 6 comprises sprockets 30 and 31, chains 32 extending over said sprockets and a plurality of griddle plates 33 pivoted at 34 to the links of the chains 32 on the outside of said chains. The front and rear edges of the adjacent plates 33 come together when the plates are folded flat against the chains 32, and each plate is formed at its forward pivoted edge with a depressed lip 35 upon which the rear of the adjacent plate rests when folded against the chains so that none of the cake dough may run between the plates. Each plate is formed with lugs 36 at their pivots for engaging pins 37 on the inside of the frame 1 under the upper reach of the chain a short distance forwardly of the delivery end of the table 5, whereby the plate is swung up into a vertical position and the cake on the upper side of the plate which is baked on one side is turned over onto the next forward plate so that it will be baked on its other side by the gas burners 40 which are mounted in the frame within the conveyor 6 near the under side of the upper plates. Other pins 41 are provided on the frame 1 for engaging the plates 33 in their vertical position and swinging the same back into their horizontal position against the chains 32 after the cakes have been turned over and delivered onto the next forward plate. As each plate 33 passes around the sprockets 31 it is swung into a vertical position and the cake, cooked on both sides, is delivered from the plate for consumption.

A sprocket 45 is secured on the journal 46 of the roller 9 and a sprocket 47 is secured on the shaft 48 on which sprocket 30 is secured, over which sprockets 45 and 47 extends a chain 49. A crank 50 is secured on the sprocket 45 for turning the same for driving the machine, the apron 7 being driven by the roller 9, the apron 11 being driven by the engagement of roller 12 with apron 7, and the conveyor 6 being driven from the sprocket 45 through the medium of the chain 49 and sprocket 47. The aprons 7 and 11 are driven so that they travel downward on the inside of the hopper whereby the dough in the hopper is carried down between the rollers 12 and 9 and out of the hopper on the apron 7 over the table 5.

Tracks 51 may be mounted on the inside of the frame 1 for the upper reaches of the chains 32 to slide on whereby the chains are prevented from sagging and are caused to travel straight.

A horizontal wall 52 extends transversely of the lower part of the frame 1 adjacent the lower reaches of the chains, which wall is engaged by the plates 33 whereby the plates are held up against said lower reaches of the chains.

The wall, together with the side members of the frame 1 forms a heat chamber 53 in which the burners 40 are located and which holds the heat of the burners for baking.

Having thus described my invention what I claim is:

1. In a machine as disclosed, a dough hopper, a pair of rollers at the lower edges of opposite walls of said hopper, rollers at the upper edges of said walls respectively, a delivery table leading from the hopper, an apron extending over both sides of one of said hopper walls and said table and over the rollers at the lower and upper edges of said hopper wall, an apron extending over both sides of the other hopper wall and over the rollers at the lower and upper edges of said wall, the roller at the lower edge of said latter hopper wall being arranged to roll the dough on said table as it passes from the hopper, a baking conveyor onto which the dough is delivered from said table, and means for heating said conveyor to bake the cakes thereon.

2. In a machine as disclosed, a dough hopper, a pair of rollers at the lower edges of opposite walls of said hopper, rollers at the upper edges of said walls respectively, a delivery table leading from the hopper, an apron extending over both sides of one of said hopper walls and said table and over the rollers at the lower and upper edges of said hopper wall, an apron extending over both sides of the other hopper wall and over the rollers at the lower and upper edges of said wall, the roller at the lower edge of said latter hopper wall being arranged to roll the dough on said table as it passes from the hopper, means for adjusting said latter roller closer to or farther away from the roller at the lower edge of the other hopper wall, a baking conveyor onto which the dough is delivered from said table, and means for heating said conveyor to bake the cakes thereon.

3. In a machine as disclosed, a dough hopper, a delivery table leading from the hopper, means for rolling the dough as it passes from the hopper over said table, means for cutting the rolled dough on the table in suitable cake lengths, a baking conveyor onto which the cut dough is delivered, said baking conveyor including a pair of endless chains, sprockets over which said chains extend, a plurality of plates pivotally mounted on said chains, means for swinging said plates upwardly to turn the cakes thereon over onto the next forward plates, and means for swinging the plates down from vertical position into normal horizontal position, and means for heating said plates to bake the cakes thereon on both sides.

In testimony whereof I affix my signature.

BLAS ENCISO.